(12) United States Patent
Shimizume et al.

(10) Patent No.: US 8,166,371 B2
(45) Date of Patent: Apr. 24, 2012

(54) SEMICONDUCTOR MEMORY SYSTEM AND SIGNAL PROCESSING SYSTEM

(75) Inventors: Kazutoshi Shimizume, Kanagawa (JP); Mamoru Akita, Kanagawa (JP); Masahiko Itoh, Kanagawa (JP)

(73) Assignee: Sony Corporation, Tokyo (JP)

( * ) Notice: Subject to any disclaimer, the term of this patent is extended or adjusted under 35 U.S.C. 154(b) by 1189 days.

(21) Appl. No.: 11/984,718

(22) Filed: Nov. 21, 2007

(65) Prior Publication Data

US 2008/0115043 A1    May 15, 2008

Related U.S. Application Data

(62) Division of application No. 11/137,442, filed on May 26, 2005, now Pat. No. 7,406,649.

(30) Foreign Application Priority Data

May 31, 2004  (JP) ................. P2004-161810

(51) Int. Cl.
*H03M 13/00* (2006.01)
(52) U.S. Cl. .................. 714/773; 714/763
(58) Field of Classification Search ........... 714/773, 714/763
See application file for complete search history.

(56) References Cited

U.S. PATENT DOCUMENTS

| | | | | |
|---|---|---|---|---|
| 4,949,342 A * | 8/1990 | Shimbo et al. | ............... | 714/769 |
| 4,972,416 A * | 11/1990 | Nagai et al. | ................ | 714/755 |
| 5,122,875 A * | 6/1992 | Raychaudhuri et al. | ... | 348/390.1 |
| 5,384,786 A * | 1/1995 | Dudley et al. | ............... | 714/784 |
| 5,490,260 A * | 2/1996 | Miller et al. | ................. | 711/100 |
| 5,509,018 A * | 4/1996 | Niijima et al. | ............... | 714/710 |
| 5,546,402 A * | 8/1996 | Niijima et al. | ............... | 714/710 |
| 5,603,001 A * | 2/1997 | Sukegawa et al. | ........... | 711/103 |
| 5,606,532 A * | 2/1997 | Lambrache et al. | ........ | 365/238.5 |
| 5,640,506 A * | 6/1997 | Duffy | ............................ | 714/6.12 |
| 5,765,185 A * | 6/1998 | Lambrache et al. | .......... | 711/103 |
| 5,822,251 A * | 10/1998 | Bruce et al. | ............. | 365/185.33 |
| 5,920,502 A * | 7/1999 | Noda et al. | ............. | 365/185.09 |
| 5,956,743 A * | 9/1999 | Bruce et al. | ................. | 711/103 |
| 6,044,484 A * | 3/2000 | Chung | ......................... | 714/766 |
| 6,185,134 B1 * | 2/2001 | Tanaka | .................... | 365/185.33 |
| 6,738,942 B1 * | 5/2004 | Sridharan et al. | ............. | 714/755 |
| 6,810,499 B2 * | 10/2004 | Sridharan et al. | ............. | 714/755 |
| 6,928,590 B2 * | 8/2005 | Ilkbahar et al. | ................ | 714/49 |

FOREIGN PATENT DOCUMENTS

JP  2000-348497  12/2000
WO  WO-97/32253  9/1997

OTHER PUBLICATIONS

Japanese Office Action issued in corresponding application No. JP2004-161810 dated Aug. 7, 2007.

* cited by examiner

*Primary Examiner* — Joseph D Torres
(74) *Attorney, Agent, or Firm* — Rader, Fishman & Grauer PLLC

(57) ABSTRACT

A semiconductor memory device provided with a data input portion for receiving 1 page's worth of data, dividing it to a plurality of code words, generating and adding check code (parity data) for each code word, successively forming main code words and transferring the same to a bank (A) or a bank (B), and a data output portion for receiving 1 page's worth of data including main code words transferred from the data latch circuit, correcting the error data when there is within a predetermined number of error data for each main code word, adding the error information for read each read code word except check code (parity data), and transferring the same to a host side, and a signal processing system using the same.

9 Claims, 12 Drawing Sheets

\* \* DATA FORMAT \* \*

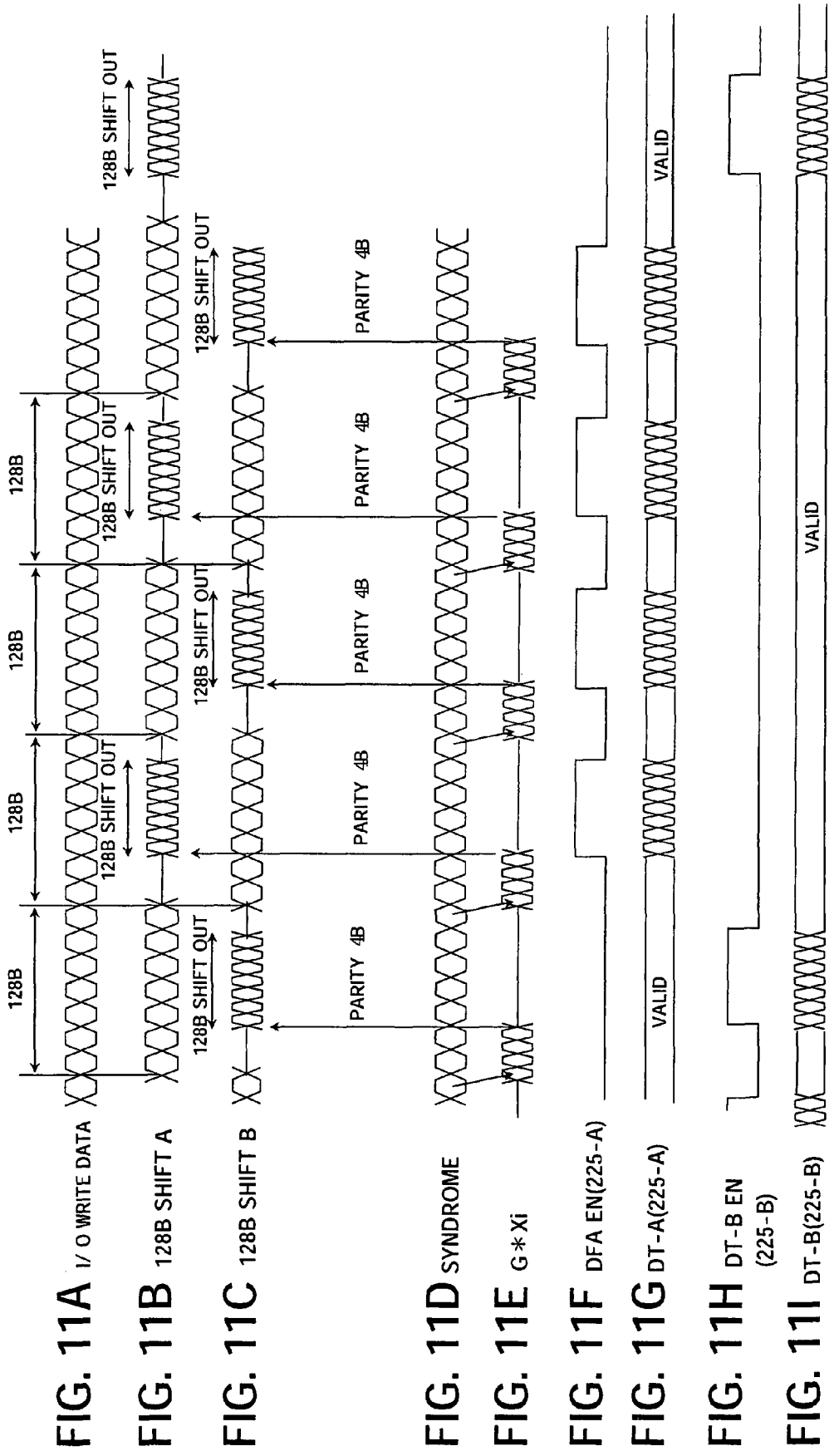

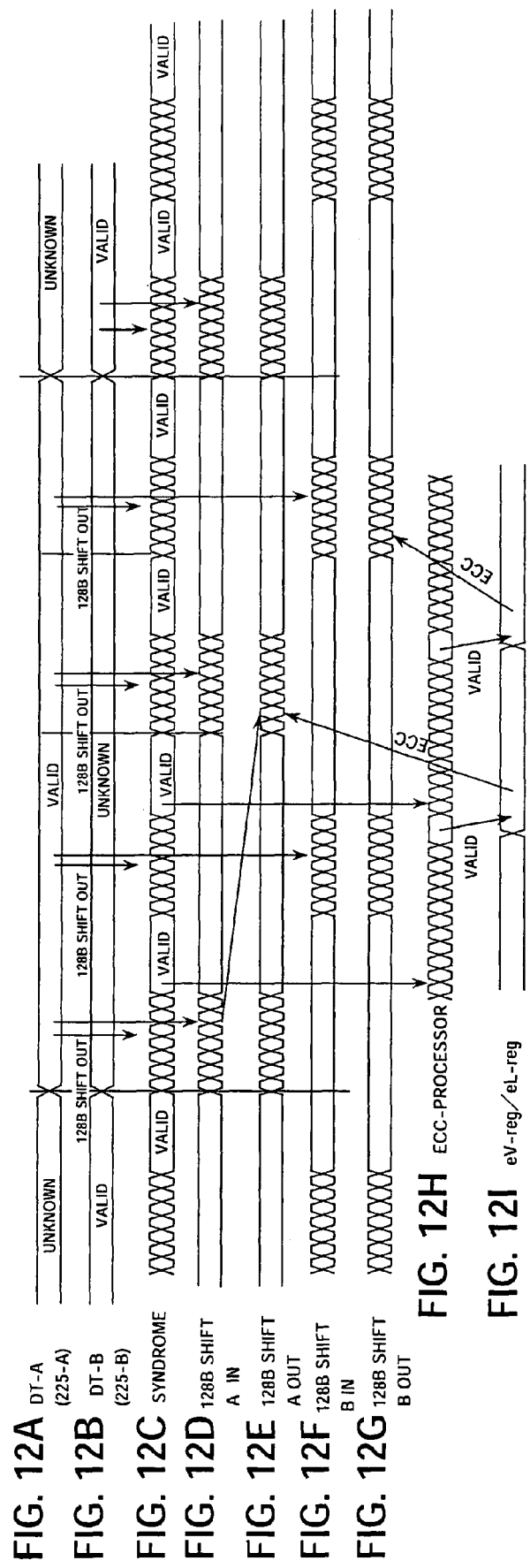

SEMICONDUCTOR MEMORY SYSTEM AND SIGNAL PROCESSING SYSTEM

CROSS REFERENCE TO RELATED APPLICATIONS

The present application is a Divisional Application of patent application Ser. No. 11/137,442, filed May 26, 2005.

CROSS REFERENCES TO RELATED APPLICATIONS

The present invention contains subject matter related to Japanese Patent Application No. 2004-161810 filed in the Japan Patent Office on May 31, 2004, the entire contents of which are incorporated herein by reference.

BACKGROUND OF THE INVENTION

1. Field of the Invention

The present invention relates to a NAND type flash memory or other semiconductor memory device having memory strings connected to bit lines and source lines via selection switches and to a signal processing system provided with such a semiconductor memory device, more particularly relates to an error correction processing technology of a semiconductor memory device.

2. Description of the Related Art

In a NAND type flash memory, a plurality of memory transistors are connected in series to form memory strings. Two memory strings share one bit contact and source line, whereby a higher integration is achieved.

In a general NAND type flash memory, an erase operation is performed by, for example, applying 0V to all word lines to which a selected memory string is connected, making all word lines to which unselected memory strings are connected floating states, and applying a high voltage (20V) to the substrate of the memory array. As a result, electrons are drained from the floating gates to the substrate for only the memory transistors of the selected memory string. As a result, the threshold voltages of the memory transistors shift to the negative direction and become, for example, −3V.

Further, data is written in units of so-called "pages" of several hundreds to several thousands bytes for memory transistors connected to the selected word line all together. Specifically, for example, a high voltage (for example, 18V) is applied to the selected word lines, 0V is applied to bit lines to which memory transistors into which data is to be written (0 data) are connected, and a high level voltage (for example 3.3V) is applied to bit lines to which memory transistors for which the writing is to be prohibited (1 data) are connected. As a result, electrons are injected into the floating gates for only the selected memory transistors into which the data is to be written. The threshold voltages of the selected memory transistors shift to the positive direction and become, for example, about 2V.

In such a NAND type flash memory, data is both written and erased by an FN (Fowler Nordheim) tunnel current, so there is the advantage that supply of an operation current from a booster circuit in a chip is relatively easy and operation with a single power supply is easy. Further, since the data is written into the memory transistors connected to the selected word lines all together in units of pages, this is superior to a NOR type flash memory in the point of the write speed.

In a nonvolatile semiconductor memory device for performing page write operations in units of word line sectors like the above mentioned NAND type flash memory, the data is written into all memory cells connected to the selected word line all together. However, the memory cells connected to the selected word line vary in size due to the production process, so differences occur in the write speed. Specifically, in a nonvolatile semiconductor memory device performing page write operations in units of word line sectors like a NAND type flash memory, a distribution arises in the time required for writing among memory cells.

Taking such variation as the write speed in account, from the viewpoint of keeping the distribution of the threshold voltage Vth at the time of the write operation narrow in a general NAND type flash memory, etc., the write operation is carried out through a verify operation. This write/verify operation is repeated until all memory cells finish being written by successively prohibiting the write operations from the memory cell finished being written for a so-called bit verify operation. In the case of a general memory cell, however, the time taken for programming is t0, but there will sometimes very rarely be memory cells which take an extremely long programming time of, for example, t1 (>t0) or more due to variation in the process. In such a case, the number of times of the above write/verify operation is set to a large number of, for example, 100 times or more for such a rare memory cell with such a slow write speed.

Further, the data is read into the NAND type flash memory by establishing the data stored in the memory cells through a sense amplifier and storing the data in a data register in units of random accessed pages, then serially transferring the page data to the outside in units of one or two bytes. Specifically, for example, a voltage of 0V is supplied to the selected word line and a voltage of about 4V is supplied to the unselected word lines. In the case of a NAND type flash memory, a plurality of memory cells is connected in series, therefore the read current of the memory cells is small in comparison with the NOR type flash memory, and thus the so-called "random access time" for establishing the data stored in the memory cells through the sense amplifier is long.

Further, in error correction of a nonvolatile semiconductor memory device, such as a NAND type flash memory, a redundant memory area is provided. A defective portion is found before shipment of the product and physically replaced by this redundant memory. The main type of error correction code (ECC) used is a hamming code, BCH code, or other code for error correction in units of bits.

SUMMARY OF THE INVENTION

In a general NAND type flash memory or other nonvolatile semiconductor memory device performing page write operations in units of word line sectors, since an ECC has a weak correction capability, as explained above, for the very rare memory cell with the very slow write speed, it is necessary to set a large number of times, for example, 100 times or more, as the number of times of the write/verify operation mentioned above and repeat this operation until the writing completely ends. Consequently, the write time sometimes becomes long.

Further, since an ECC has a weak correction capability, it is necessary to form a redundant memory array other than the normal memory array. Namely, it is necessary to perform troublesome processing of adding redundant memory for improving the yield at the time of the production of LSIs, carry out measurement, and replace defective memory with the redundant memory. Further, there is the disadvantage that the size of the memory per se becomes larger by exactly the amount of the redundant memory, and the number of processes becomes larger by the amount of the redundant memory formed, and consequently a rise in cost is induced.

In the error correction circuits in related art, it is impossible to change the strategy of the ECC in accordance with the importance of the data.

In the present invention, it is desirable to provide a semiconductor memory device able to strengthen the error correction capability, able to shorten the write time and/or read time, and able to make redundant memory unnecessary or reduce the same, and consequently able to achieve a reduction of size and able to achieve a reduction of cost, and a signal processing system using the same.

According to a first aspect of an embodiment of the present invention, there is provided a semiconductor memory device having a cell array formed by a plurality of memory cells storing data therein arranged in a matrix, wherein data is stored in the cell array in units of pages, the page data is divided into a plurality of sectors, and a check code is added for every sector.

Preferably, page data including a plurality of sectors added with check codes are stored in the cell array in units of pages all together.

According to a second aspect of an embodiment of the present invention, there is provided a semiconductor memory device having a cell array formed by a plurality of memory cells arranged in a matrix and into which page data including a plurality of main code words is written in units of a plurality of memory cells, a latch circuit for latching the page data to be written including at least the plurality of main code words, a data input portion for dividing the page data to be written into a plurality of code words, checking each code word and generating check codes, adding the check codes to corresponding code words to form main code words, and successively transferring the formed main code words to the latch circuit, and a control circuit for writing the page data into the cell array all together when the page data including a plurality of main code words added with the check codes are latched by the latch circuit.

Preferably, the data input portion includes a latch circuit for latching the page data to be written including at least the plurality of main code words, a plurality of shift registers able to successively shift in and hold the code words included in the page data to be written, a first switch circuit for receiving the page data to be written including code words able to be divided into a plurality of code words and inputting at least successive code words to the different shift registers, a second switch circuit for selectively outputting the code word data in which the code words are all shifted, a check code generation circuit for checking the code words selected so as to be output by the second switch circuit and generating the check codes, and an additional circuit for adding the check codes to the code words selectively output by the second switch circuit and outputting the same as the main code words to the latch circuit.

According to a third aspect of an embodiment of the present invention, there is provided a semiconductor memory device having a cell array formed by a plurality of memory cells arranged in the matrix and in which page data including a plurality of main code words added with check codes are recorded in units of a plurality of memory cells, a latch circuit for latching at least the page data including a plurality of main code words added with the check codes recorded in the cell array which were read out from the cell array, a data output portion for receiving the page data including a plurality of main code words having check codes added thereto transferred from the latch circuit, correcting the error data when there is within a predetermined number of error data for each main code word, adding corresponding error information for each code word except the check code and successively outputting the result, and a control circuit for reading the page data including a plurality of code words having the check codes added thereto from the cell array and making the latch circuit latch the page data and transfer the latch data to the data output portion.

Preferably, the data output portion includes a plurality of shift registers able to successively shift in and hold the code words except the check codes included in the read out page data transferred from the latch circuit, a first switch circuit for receiving the read out page data including the code words divided into a plurality of code words and inputting at least successive code words to different shift registers, a second switch circuit for selectively outputting the code word data into which all code words are shifted among the shift registers, an error correction circuit for correcting the error data when there is within a predetermined number of error data in the main code words corresponding to the code words output from the second switch, and an additional circuit for adding the error information from the error correction circuit to the code words selectively output by the second switch circuit and outputting the same.

Preferably, the data output portion generates syndrome data, performs the error correction, and outputs the syndrome data where it is unable to correct the error irrespective of at least the error data existing. Preferably, the data output portion outputs information indicating the state of the error correction.

Preferably, the control circuit makes the latch circuit transfer data to the first circuit for each code word having the check code added thereto among the latched data of the latch circuit.

According to a fourth aspect of an embodiment of the present invention, there is provided a semiconductor memory device having a cell array formed by a plurality of memory cells arranged in a matrix and into which page data including a plurality of main code words is written in units of a plurality of memory cells, a latch circuit for latching the page data to be written including at least the plurality of main code words, a data input portion for dividing the page data to be written into a plurality of code words, checking each code word and generating check codes, adding the check codes to corresponding code words to form main code words, and successively transferring the formed main code words to the latch circuit, a data output portion for receiving the page data including a plurality of main code words having the check codes added thereto transferred from the latch circuit, correcting the error data when there is within a predetermined number of error data for each main code word, adding the corresponding error information for each code word except the check code, and successively outputting the result, and a control circuit for making the latch circuit write the page data into the cell array all together when page data including a plurality of main code words having the check codes added thereto is latched by the latch circuit, read out the page data including a plurality of code words having the check codes added thereto from the cell array and latch the page data in the latch circuit, and transfer the latch data to the data output portion.

According to a fifth aspect of an embodiment of the present invention, there is provided a semiconductor memory device having a plurality of banks each including a cell array formed by a plurality of memory cells arranged in a matrix and into which page data including a plurality of main code words is written in units of a plurality of memory cells and a latch circuit for latching the page data to be written including at least the plurality of main code words, a data input portion for dividing the page data to be written into a plurality of code words, checking each code word and generating check codes, adding the check codes to corresponding code words to form main code words, and successively transferring the formed main code words to the latch circuit, and a control circuit for making the latch circuit of any bank among the plurality of banks selectively latch the main code word data having the check code added thereto and write the page data into the cell array all together when the page data including a plurality of main code words having the check codes added thereto is latched by the latch circuit.

According to a sixth aspect of an embodiment of the present invention, there is provided a semiconductor memory device having a plurality of banks each including a cell array formed by a plurality of memory cells arranged in the matrix and in which page data including a plurality of main code words added with check codes are recorded in units of a plurality of memory cells and a latch circuit for latching at least the page data including a plurality of main code words added with the check codes recorded in the cell array which were read out from the cell array, a data output portion for receiving the page data including a plurality of main code words having check codes added thereto transferred from the latch circuit, correcting the error data when there is within a predetermined number of error data for each main code word, adding corresponding error information for each code word except the check code, and successively outputting the result, and a control circuit for selectively reading the page data including a plurality of code words having the check codes added thereto from the cell array of any bank among the plurality of banks and making the latch circuit latch the page data and transfer the latch data to the data output portion.

According to a seventh aspect of an embodiment of the present invention, there is provided a semiconductor memory device having a plurality of banks each including a cell array formed by a plurality of memory cells arranged in a matrix and into which page data including a plurality of main code words is written in units of a plurality of memory cells and a latch circuit for latching the page data to be written including at least the plurality of main code words, a data input portion for dividing the page data to be written into a plurality of code words, checking each code word and generating check codes, adding the check codes to corresponding code words to form main code words, and successively transferring the formed main code words to the latch circuit, a data output portion for receiving the page data including a plurality of main code words having the check codes added thereto transferred from the latch circuit, correcting the error data when there is within a predetermined number of error data for each main code word, adding the corresponding error information for each code word except the check code, and successively outputting the result, and a control circuit for making the latch circuit of any bank among the plurality of banks selectively latch the main code word data having the check codes added thereto, writing the page data into the cell array all together when the page data including a plurality of main code words having the check codes added thereto is latched by the latch circuit, selectively reading out the page data including a plurality of main codes having the check codes added thereto from the cell array of any bank among the plurality of banks, and making the latch circuit latch the page data and transfer the latch data to the data output portion.

According to an eighth aspect of an embodiment of the present invention, there is provided a signal processing system having a first semiconductor memory device, a second semiconductor memory device to which stored data of the first semiconductor memory device is read out, and a host device for controlling access of the first and second semiconductor memory devices and performing predetermined signal processing according to the data stored in the second semiconductor memory device, wherein the first semiconductor memory device includes a cell array formed by a plurality of memory cells arranged in a matrix and into which page data including a plurality of main code words is written in units of a plurality of memory cells, a latch circuit for latching the page data to be written including at least the plurality of main code words, a data input portion for dividing the page data to be written into a plurality of code words, checking each code word and generating check codes, adding the check codes to corresponding code words to form main code words, and successively transferring the formed main code words to the latch circuit, and a control circuit for writing the page data into the cell array all together when the page data including a plurality of main code words added with the check codes are latched by the latch circuit.

According to a ninth aspect of an embodiment of the present invention, there is provided a signal processing system having a first semiconductor memory device, a second semiconductor memory device to which stored data of the first semiconductor memory device is read out, and a host device for controlling access of the first and second semiconductor memory devices and performing predetermined signal processing according to the data stored in the second semiconductor memory device, wherein the first semiconductor memory device includes a cell array formed by a plurality of memory cells arranged in the matrix and in which page data including a plurality of main code words added with check codes are recorded in units of a plurality of memory cells, a latch circuit for latching at least the page data including a plurality of main code words added with the check codes recorded in the cell array which were read out from the cell array, a data output portion for receiving the page data including a plurality of main code words having check codes added thereto transferred from the latch circuit, correcting the error data when there is within a predetermined number of error data for each main code word, adding corresponding error information for each code word except the check code and successively outputting the result, and a control circuit for reading the page data including a plurality of code words having the check codes added thereto from the cell array, making the latch circuit latch the page data, and transferring the latch data to the data output portion.

According to an embodiment of the present invention, for example, page data to be written able to be divided into a plurality of code words are input to the data input portion from an external host controller. The data input portion performs the check for each code word forming the input page data and generates check codes. Then, the generated check codes are added to corresponding code words to form main code words. The formed main code words are successively transferred to the latch circuit. When the page data including a plurality of main code words having the check codes added thereto are latched by the latch circuit, the page data is written into the cell array all together by the control circuit.

Further, according to an embodiment of the present invention, under the control of, for example, the control circuit, the page data including a plurality of code words having the check codes added thereto are read out from the cell array to the latch circuit and latched. The latch data of the latch circuit is transferred to the data output portion. The data output portion receives the page data including a plurality of main code words having the check codes added thereto transferred from the latch circuit and corrects the error data for each main code word when it is within a predetermined number of error data. Then, the corresponding error information is added for each code word except the check code and the result is successively output to the outside.

BRIEF DESCRIPTION OF THE DRAWINGS

These and other objects and features of the present invention will become clearer from the following description of the preferred embodiments given with reference to the attached drawings, wherein:

FIGS. 11A to 11I are timing charts for explaining a write operation sequence of a flash memory according to the present embodiment; and FIGS. 12A to 12I are timing charts for explaining a read operation sequence of the flash memory according to the present embodiment.

DESCRIPTION OF THE PREFERRED EMBODIMENTS

Below, an explanation will be given of preferred embodiments of the present invention with reference to the drawings.

Figure 1:
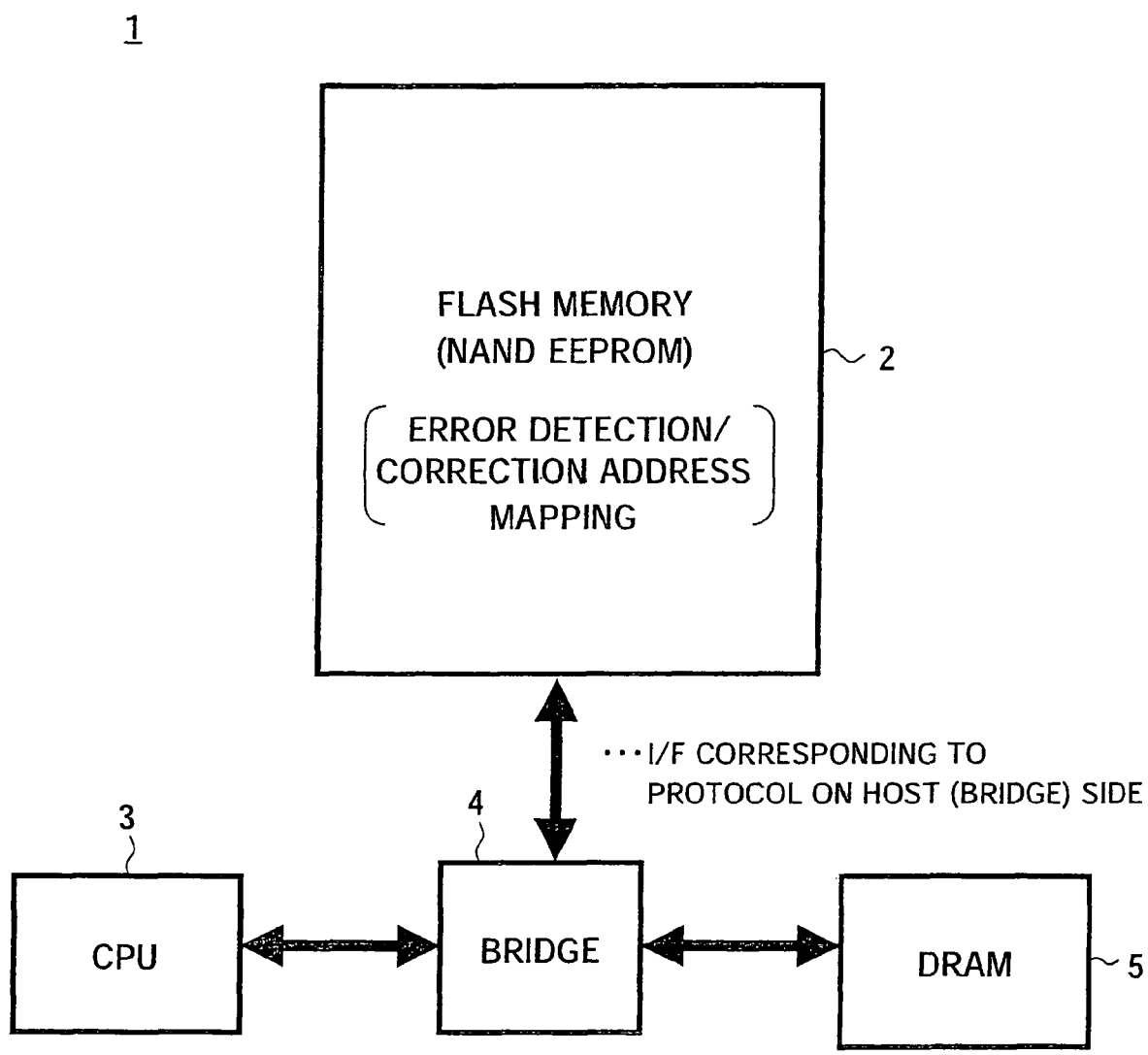
FIG. 1 is a block diagram of the overall configuration of a signal processing system employing a semiconductor memory device according to an embodiment of the present invention.

FIG. 1 is a block diagram of the overall configuration of a signal processing system employing a semiconductor memory device according to an embodiment of the present invention. In the present embodiment, as the semiconductor memory device, a NAND type flash memory in which memory strings formed by connecting pluralities of memory cells in series are connected to bit lines and source lines via selection switches is employed.

The signal processing system 1 has, as shown in FIG. 1, a NAND type flash memory 2 as a first semiconductor memory device, a central processing unit (CPU) 3 as a host device, a bridge circuit 4, and, for example, a dynamic random access memory (DRAM) 5 as a second semiconductor memory device.

In the signal processing system 1, the host side CPU 3 and the NAND type flash memory 2 are connected via the bridge circuit 4. Access requests from the CPU 4 for read operations and write operations with respect to the flash memory 2 are received once by the control circuit built in the flash memory 2. The control circuit performs address translation processing (mapping for translating a logical address designated by the CPU 4 to a physical address on the flash memory, that is, logical/physical address translation processing), and so on. Further, the flash memory 2 has a function for performing error detection/correction processing with respect to the read data from the cell array and addition etc. of an error correction code for the write data to the cell array.

This signal processing system 1 makes good use of, for example, the characteristics of the NAND type flash memory 2. The NAND type flash memory 2 is applied as a storage device of the system's operating system program and application program or a storage device of image or audio data. In the signal processing system 1, at the time the power is turned on, at the time of a forcible reset, or at the time of a system reset, the data stored in the NAND type flash memory 2 is read out at a high speed, for example, a high speed of about 1 GB/s, and transferred through the bridge circuit 4 to the DRAM 5 at a high speed. After that, the CPU 3 can start up the system at a high speed by accessing the DRAM 5 and can perform various signal processing in accordance with the applications such as image processing, audio processing, or display processing or audio output processing accompanying the same.

Further, the function of the flash memory 2 for performing the error detection/correction processing with respect to the read data from the cell array and the addition, etc. of the error correction code for the write data to the cell array basically employs nonvolatile error correction using a Reed Solomon (RS) code.

In the present embodiment, units of word line sectors of page data are written into the cell array of the NAND type flash memory all together. In the present embodiment, an error correction method is employed which is able to perform high speed error correction not affecting the write and read speed of the memory where there is no error correction processing by dividing one page's worth of write data into a plurality of code words, providing a plurality of ECC use registers, and alternately performing the error correction processing.

The flash memory 2 according to the present embodiment basically has a plurality of banks and accesses a plurality of banks in parallel so as thereby to enable high speed data transfer. Then, by enabling independent simultaneous access to a plurality of banks, high speed write and read operations are possible. The memory has the function of performing error correction processing adding a check code (parity) to each code word at the time of the data write operation, recording the parity simultaneously and parallel to the normal data in the cell array as the main code words, reading also the parity together with the normal data when reading the data, and restoring the data lost inside the memory.

Here, for facilitating the explanation, the explanation will be given by assuming the number of banks as two. Further, the explanation will be given under the following assumptions.

Figure 2A:
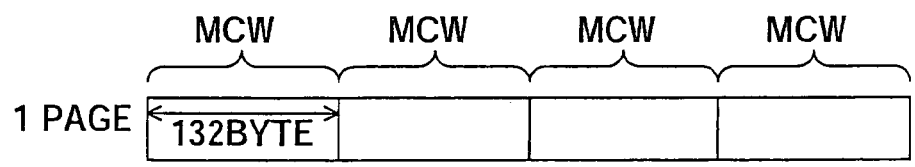
FIGS. 2A and 2B are views for explaining an example of the configuration of one page data according to the present embodiment.
Figure 2B:
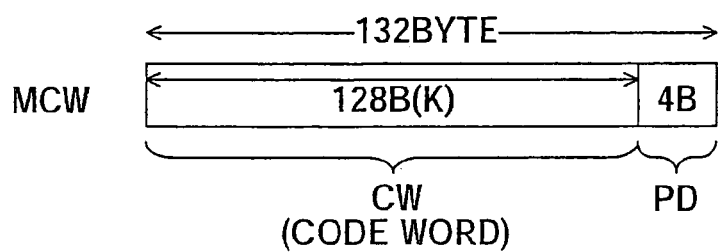
Figure 3:
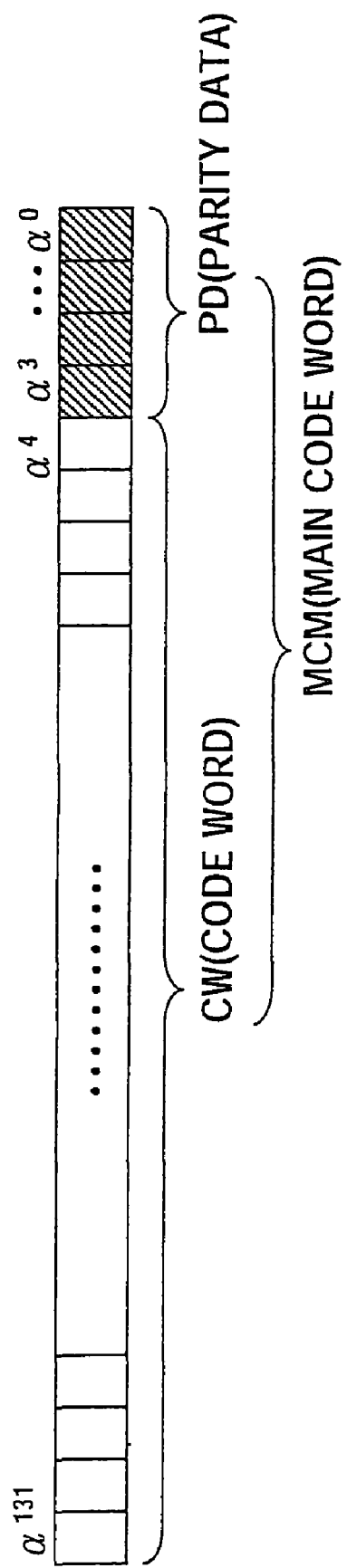
FIG. 3 is a view for explaining the structure in a main code word and a position of arrangement of parity data (check code) according to the present embodiment.

512 bytes+16 bytes are 1 page. One page is formed by four main code words MCW, each including 132 bytes (128 bytes of code words CW and 4 bytes of parity data (check codes PD)), as shown in FIG. 2 and FIG. 3. Further, the code word is a Reed Solomon Code of GF (28). The minimum distance 5 is assumed. GF shows a Galois Field, and 28 means the 8th power of 2. One sector is formed by this main code word. This one sector is formed by the normal data (128 bytes) and the parity data (4 bytes). In this case, the redundancy of the parity becomes about 3%. Although not mentioned here, the minimum code distance is not limited to five in the present embodiment. Further, the length of 132 bytes of the code word is not limited.

Below, an explanation will be given focusing on the more specific configurations and functions of the NAND type flash memory 2 according to the present embodiment.

Figure 4:
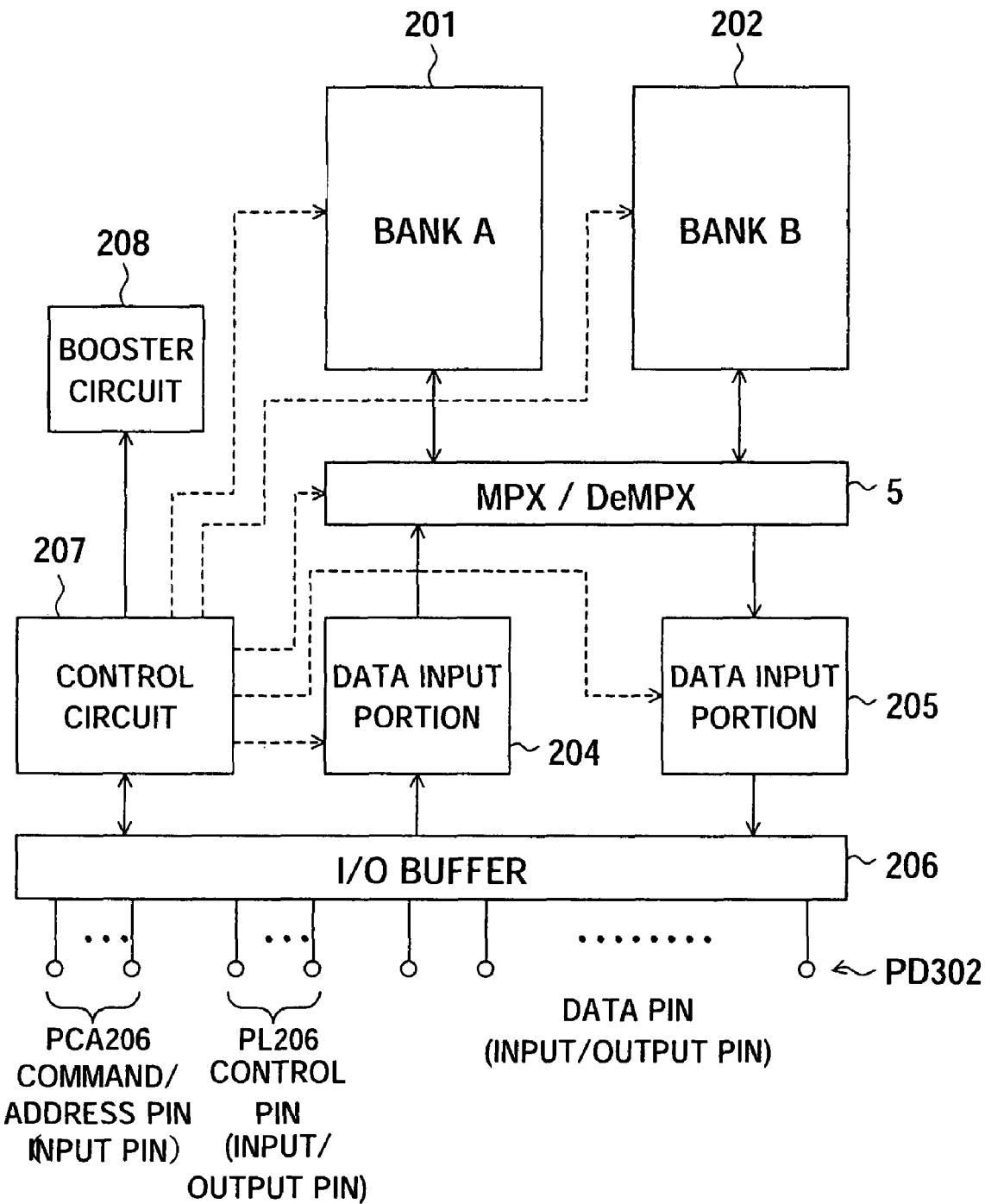
FIG. 4 is a block diagram of an example of the configuration of a NAND type flash memory of FIG. 1.
Figure 5:
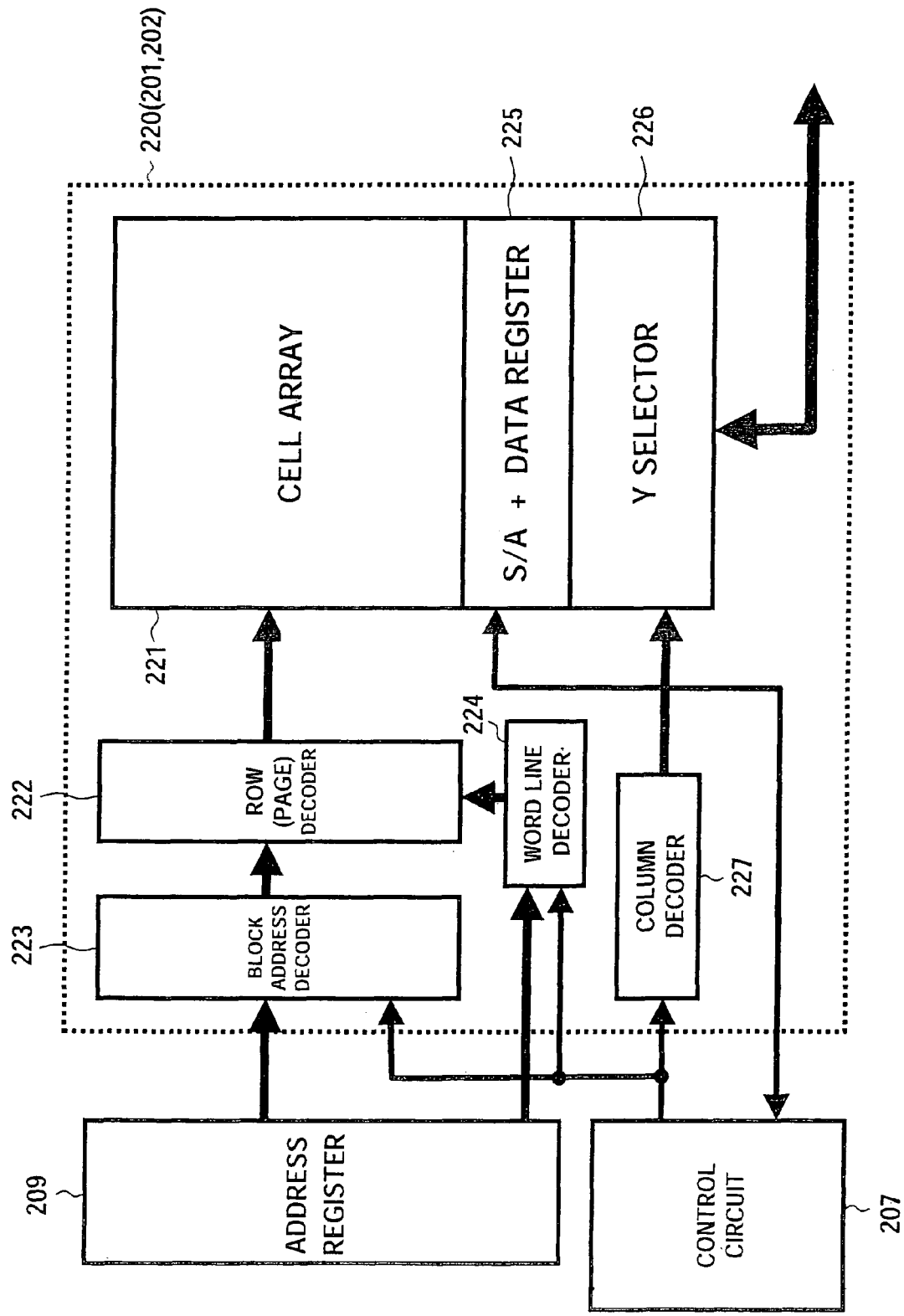
FIG. 5 is a block diagram of a specific example of the configuration of a bank in FIG. 4.

FIG. 4 is a block diagram of an example of the configuration of the NAND type flash memory of FIG. 1. FIG. 5 is a block diagram of a specific example of the configuration of a bank in FIG. 4.

The flash memory 2 of FIG. 4 has, as principal elements, two banks 201(A) and 202(B) including cell arrays, a multiplexer (MPX)/demultiplexer (DeMPX) 203, a data input portion 204, a data output portion 205, an I/O buffer 206, a control circuit 207, and a booster circuit 208.

Further, as shown in FIG. 5, each bank (A, B) 220 (201, 202) has a cell array 221 formed by memory cells arrayed in a matrix, a row (page) decoder 222, a block address decoder 223, a word line decoder 224, a data latch circuit (DT1) 225 including a sense amplifier (S/A) and a data register arranged on the data input/output side of the cell array 221, a column selector (Y-selector) 226, and a column decoder 227. Further, in FIG. 5, an address register 209 is provided.

Figure 6:
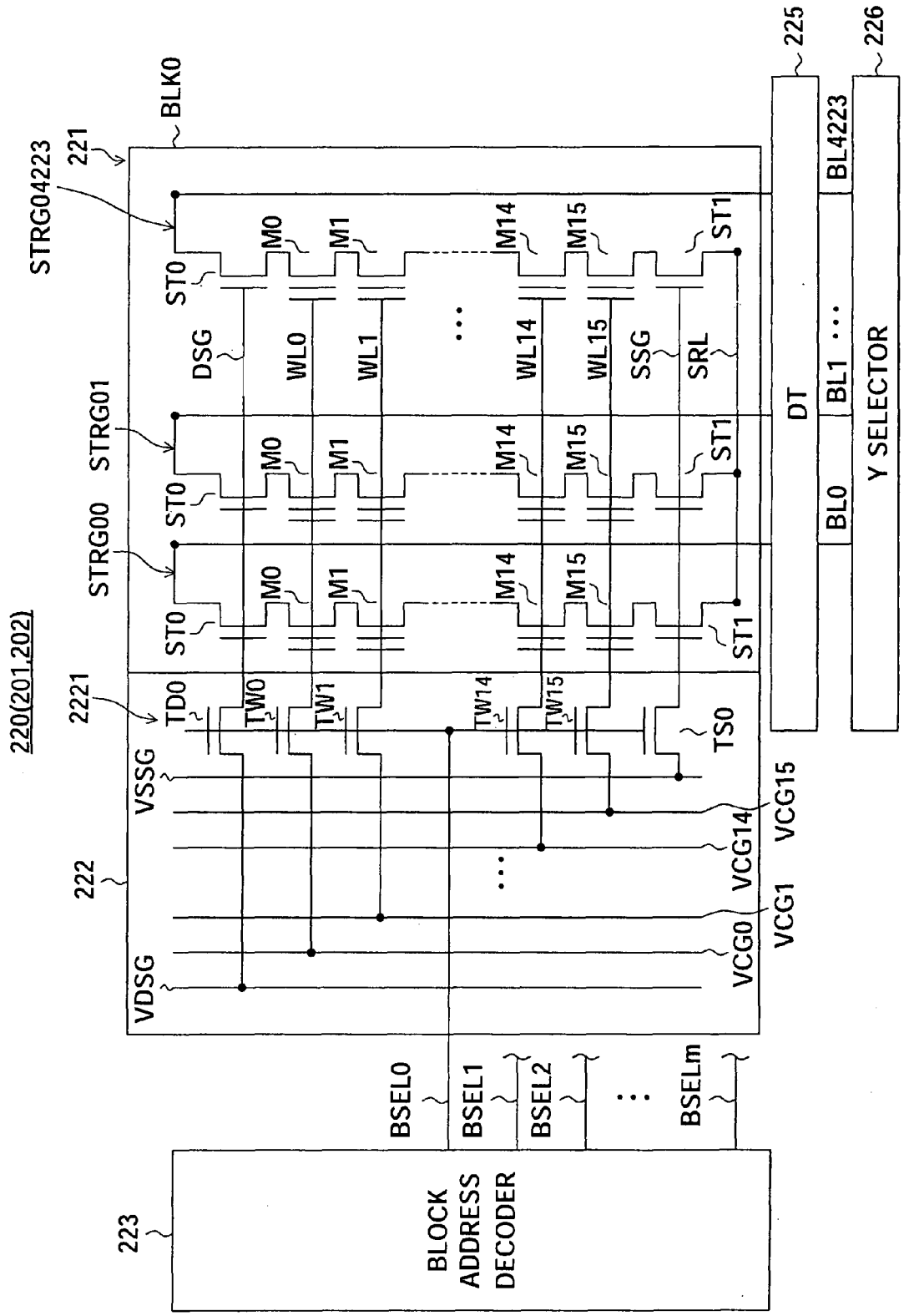
FIG. 6 is a view for explaining a specific example of the configuration of a bank and a row decoder of FIG. 5.

In the cell array 221, as shown in FIG. 6, memory strings STRG00, and STRG01, to STRG04223 configured by a plurality of, for example, 16 memory transistors M0 to M15 connected in series and two selection transistors ST0 and ST1 connected in series to the two ends thereof are arranged in a matrix. Note that, in FIG. 6, for simplification of the drawing, only one block BLK0 formed by 4224 memory strings STRG00 to STRG04223 arranged in one row and 4224 columns is shown, but in actuality, a plurality of (m number of) blocks BLK1 to BLKM having the same configurations as that of the block BLK0 are further arrayed in each bank 220. Further, in the example of FIG. 6, the number of bit lines was made the amount 528 bytes for the usual 512 bytes plus a spare 16 bytes, that is, 4224 lines. This corresponds to the data of one page of the present embodiment.

The selection transistor ST0 connected to a drain of the memory transistor M0 of the memory string STRG00 is connected to the bit line BL0, the drain of the memory transistor M0 of the memory string STRG01 is connected to the bit line BL1, and the drain of the memory transistor M0 of the memory string STRG4223 is connected to the bit line BL4223 in the same way. Further, the selection transistor ST1 to which the source of the memory transistor M15 of each of the memory strings STRG00 to 04223 is connected is connected to a common source line SRL.

Further, the gate electrodes of the memory transistors of the memory strings STRG00 and STRG01 to STRG04223 arranged in the same row are connected to common word lines WL0 to WL15, the gate electrodes of the selection transistors ST0 are connected to a common selected gate line DSG, and the gate electrodes of the selection transistors ST1 are connected to a common selected gate line SSG.

The row decoder 222 has a transfer gate group 2221 controlled in conduction state by the block address decoder 223, and selected gate line drive voltage supply lines VCG0 to VCG15, VDSG, and VSSG supply voltages for the word lines and selected gate lines from the word line decoder 224. Note that, in FIG. 6, a block address decoder portion and a transfer gate group corresponding to the block BLK0 are shown for the simplification of the drawing, but in actuality, the block address decoder portions and transfer gate groups are provided corresponding to a plurality of arrayed, not illustrated blocks.

The transfer gate group 2221 is configured by transfer gates TW0 to TW15, TD0, and TS0. The transfer gate group 2221 is held in the conductive state by a signal BSEL which is generated in response to the block address decoded at the block address decoder 223 and drives the selected gate line and word line of the corresponding block. Specifically, when the block BLK0 is address designated, the transfer gates TW0 to TW15 operationally connect the word lines WL0 to WL15 and the drive voltage supply lines VCG0 to VCG15 in response to the output signal BSEL0 of the block address decoder 223, and the transfer gates TD0 and TS0 operationally connect the selected gate lines DSG and SSG and the drive voltage supply lines VDSG and VSSG in response to the output signal BSEL0 of the block address decoder 223 in the same way.

The block address decoder 223 decodes the block addresses from an address held in the address register 209 and holds the transfer gate group 2221 for driving the selected gate line and word line of the corresponding block of the row decoder 222 in the conductive state by the signal BSEL in response to the decoded block address.

The word line decoder 224 generates drive voltages boosted by the booster circuit 208 in accordance with the operation to the drive voltage supply lines VCG0 to VCG15, VDSG, and VSSG from the address held in the address registers 209 in response to control signals indicating a read, write, or erase operation of the bank control circuits 207 and supplies the same to the row decoder 222.

In a bank 220 having such a configuration, for example, a read operation of the data of the memory transistor M14 of the memory string STRG00 (to TRG04223) of the block BLK0 of the first row and a write operation of the data into the memory transistor M14 are carried out as follows.

Figure 7:
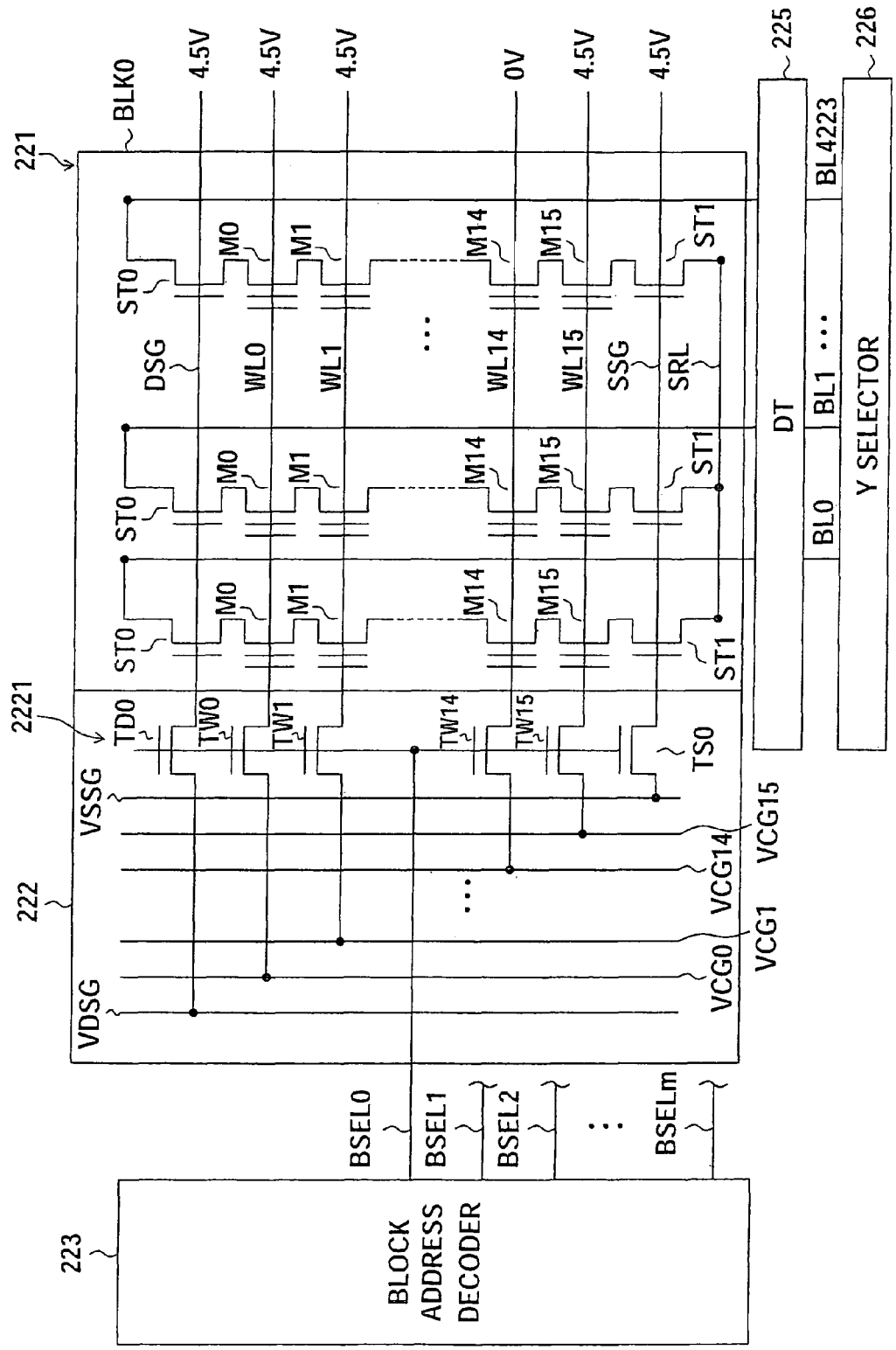
FIG. 7 is a view showing the bias condition of each drive line at the time of a data read operation in the bank of FIG. 4.

At the time of a read operation, as shown in FIG. 7, a ground voltage GND (0V) is supplied to the drive voltage supply line VCG14 by the word line decoder 224, for example, 4.5V is supplied to the drive voltage supply lines VCG0 to VCG13 and VCG15 and the drive voltage supply lines VDSG and VSSG, and the ground voltage 0V is supplied to the source line SRL. Then, in the block address decoder 223, the active address signal is input to only a portion corresponding to the block BLK0, the output signal BSEL0 of the block address decoder 223 is output at a level of 4.5V+α, and the output signals BSEL1 to BSELm of the block address decoder corresponding to the other blocks BLK1 to BLFm are held at the ground potential GND level. Due to this, the transfer gates TW0 to TW15 and TD0 and TS0 of the transfer gate group 2221 corresponding to the block BLK0 become the conductive state, and the transfer gates of the transfer gate group corresponding to the other blocks BLK1 to BLKm are held in the non-conductive state. As a result, the selection transistors ST0 and ST1 of the memory string STRG00 become the conductive state, and the data is read out to the bit line BL0.

Figure 8:
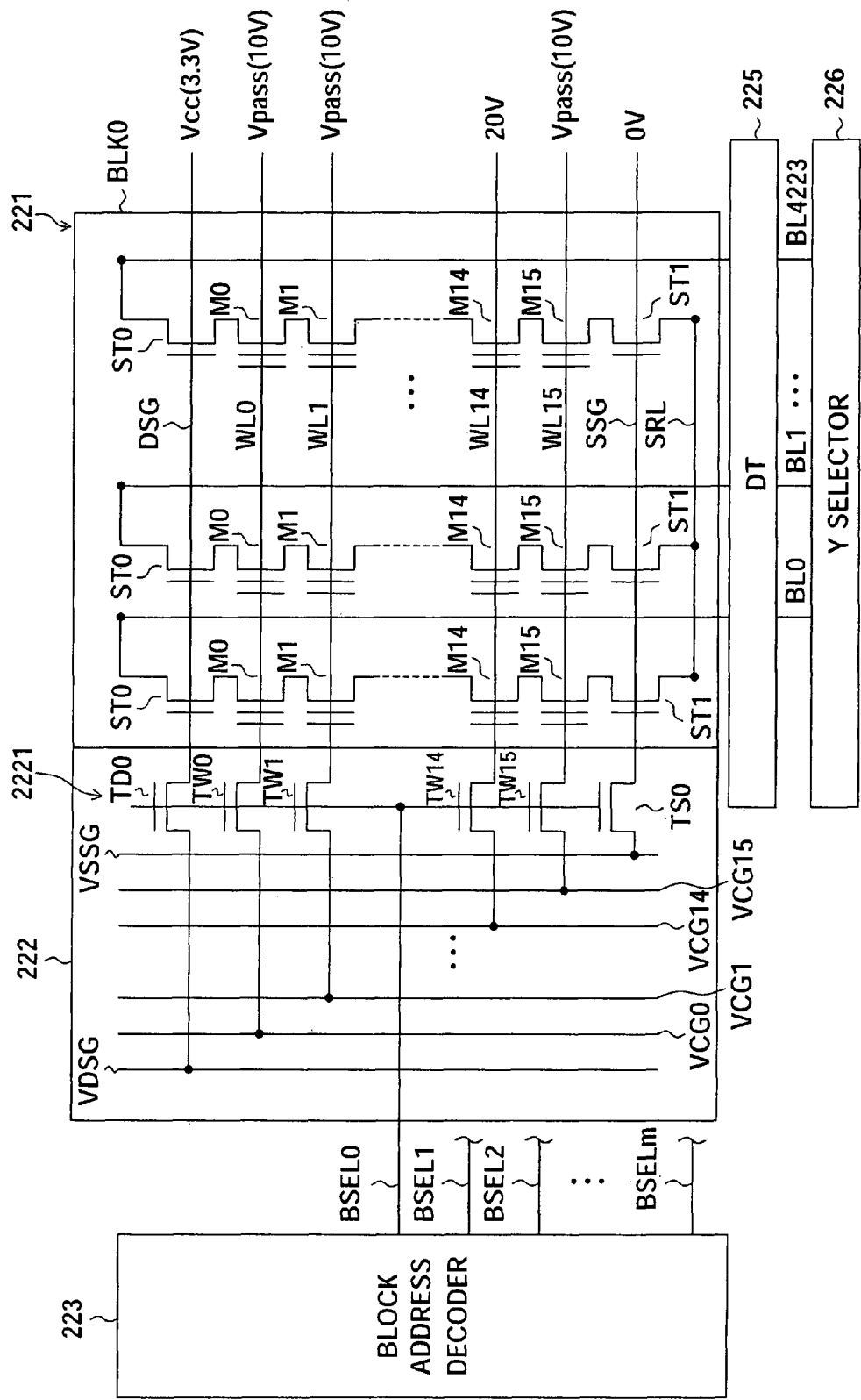
FIG. 8 is a view showing the bias condition of each drive line at the time of a data write operation in the bank of FIG. 4.

At the time of a write operation, as shown in FIG. 8, a high voltage, for example 20V, is supplied to the drive voltage supply line VCG14 selected by the word line decoder 224, intermediate voltages (for example, 10V) are applied to the drive voltage supply lines VCG0 to VCG13 and VCG15, the power supply voltage Vcc (for example, 3.3V) are supplied to the drive voltage supply line VDSG and the ground potential GND (0V) is supplied to the drive voltage supply line VSSG. Further, the ground voltage GND is supplied to the bit line BL0 to which the memory string STRG00 having the memory transistor M14 to which the writing is to be carried out is connected, and the power supply voltage Vcc is supplied to the bit lines BL1 to BL04223 to which memory strings STRG01 to STRG04223 having memory transistors M14 for which the writing is to be prohibited are connected. Then, the output signal BSEL0 of the block address decoder 223 is output to only the portion corresponding to the block BLK0 of the row decoder 222 at the level of 20V+α, and the output signals BSEL1 to BSELm of the block address decoder corresponding to the other blocks BLK1 to BLKm are output at the ground voltage GND level. Due to this, the transfer gates TW0 to TW15, TD0, and TS0 of the transfer gate group 2221 corresponding to the block BLK0 become the conductive state, and the transfer gates of the transfer gate groups corresponding to the other blocks BLK1 to BLKm are held in the non-conductive state. As a result, the write voltage 20V is supplied to the selected word line WL14, and pass voltages (intermediate voltages) Vpass (for example 10V) are applied to the unselected word lines WL0 to WL13, and WL15.

Due to this, the selection transistors ST0 of the memory strings STRG01 to STRG04223 become cut off, and the channel portions of the memory strings STRG01 to STRG04223 to which the memory transistors for which the writing is to be prohibited are connected enter a floating state. As a result, the potentials of these channel portions are boosted by capacitor coupling with the pass voltage Vpass mainly supplied to the unselected word lines and rise up to the write prohibit voltage, whereby writing of data into the memory transistors M14 of the memory strings STRG01 to STRG04223 is prohibited. On the other hand, the channel portion of the memory string STRG00 to which the memory transistor to be written with the data is connected is set at the ground potential GND (0V), the data is written into the memory transistor M14 by the potential difference between this and the write voltage 20V supplied to the selected word line WL14, and the threshold voltage shifts to the positive direction and becomes, for example, about 2V from −3V of the erase state.

As in the above operation, in the NAND type flash memory 2 of the present embodiment, in accordance with the address held in the address register 209, the data is read in units of rows (pages) from the cell array 221 of the corresponding bank 201 or 202, and the data is written into the cell array 221 in units of rows (pages).

The multiplexer/demultiplexer 203 switches the page data to be written including four main code words by the data input portion 204 at the predetermined timing under the control of the control circuit 207 and selectively transfers the same to the data latch circuit 225 of the bank (A) 201 through the column selector 226 or transfers the same to the data latch circuit 225 of the bank (B) 202 through the column selector 226 at the time of the write operation.

The multiplexer/demultiplexer 203 switches the read data including four main code words MCW transferred from the data latch circuit 225 of the bank (A) 201 through the column selector 226 and the read data including four main code words MCW transferred from the data latch circuit 225 of the bank (B) 202 through the column selector 226 under the control of the control circuit 207 and selectively inputs the same to the data output portion 205 at the time of the read operation.

The data input portion 204 divides 1 page's (512 bytes') worth of the data transferred from the CPU 3 through the I/O buffer 206 to four code words CW under the control of the control circuit 207, generates and adds 4 bytes of parity data for each code word (128 bytes), successively forms four main code words MCW each formed by 132 bytes, and transfers the same through the multiplexer/demultiplexer 203 to the bank (A) 201 or bank (B) 202.

Figure 9:
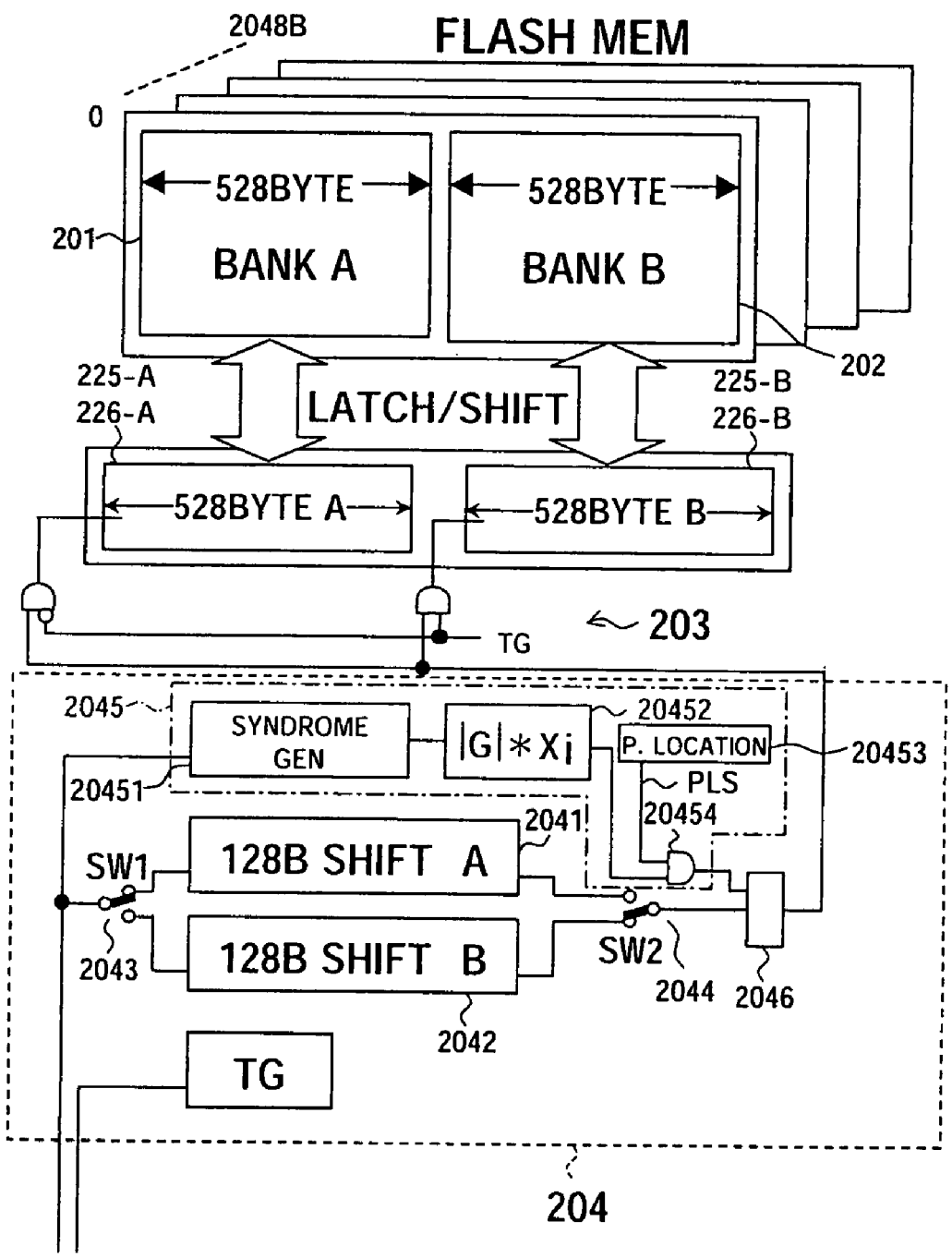
FIG. 9 is a circuit diagram showing a specific example of the configuration of a data input portion according to the present embodiment.

FIG. 9 is a circuit diagram showing a specific example of the configuration of the data input portion 204 according to the present embodiment.

The data input portion 204 of FIG. 9 has a plurality of (in the present embodiment, two, i.e., first and second) shift registers 2041 and 2042 which successively shift in the code words CW (128 bytes) included in the page data to be written, a first switch circuit (SW1) 2043 receiving the page data to be written including the code words CW able to be divided to a plurality of (in the present embodiment, four) code words and alternately inputting the successive code words to the first shift register 2041 and the second shift register 2042 under the control of the control circuit 207, a second switch circuit 2044 for selectively outputting the code word data to which all of the code words CW are shifted in between the first and second shift registers 2041 and 2042 under the control of the control circuit 207, a check code generation circuit 2045 for checking the code words selected so as to be output by the second switch circuit 2044 and generating 4 bytes of parity data PD (check codes), and an additional circuit 2046 for adding (combining) the parity data PD (check codes) with respect to 128 bytes of the code words CW selectively output by the second switch circuit 2044 and transferring the same as 132 bytes of the main code words MCW through the multiplexer/demultiplexer 203 to the bank (A) 201 or the bank (B) 202.

The check code generation circuit 2045 has a syndrome generation circuit (Syndrome Gen) 20451, a G matrix processing circuit 20452, an output timing generation circuit 20453, and a 2-input AND gate 20454.

In the check code generation circuit 2045 having such a configuration, four variables Xi generated at the syndrome generation circuit 20451 are sent to the G matrix processing circuit 20452 and matrix processed, whereby 4 bytes of parity are generated. The syndrome generation circuit 20451 is reset at the point of time when the four variables Xi are sent to the G matrix processing circuit 20452. The G matrix processing circuit 20452 performs the parity calculation until the corresponding code words become a full 128 bytes at the first shift register 2041 or the second shift register 2042. At, for example, the timing when the code word data of the first shift register 2041 or the second shift register 2042 to which full corresponding code words have been shifted is selected by the second switch circuit 2044, the parity data PD is output from the AND gate 20454 by an output pulse PLS from the output timing generation circuit 20453. Further, the reset syndrome circuit 20451 receives as input the next 128 bytes of the code words. These code words are shifted to the second shift register 2042 or the first shift register 2041 different from that of the previous time via the first switch circuit 2043.

The data output portion 205 receives one page's (512 bytes+16 bytes) worth of data including four main code words MCW transferred from the data latch circuit 225 through the multiplexer/demultiplexer 203 under the control of the control circuit 207, corrects the error data when there is within a predetermined number of error data for each main code word (132 bytes), adds the error information for each read code word CW except the parity data PD, and transfers the result to the external CPU 3 via the I/O buffer 206.

Figure 10:
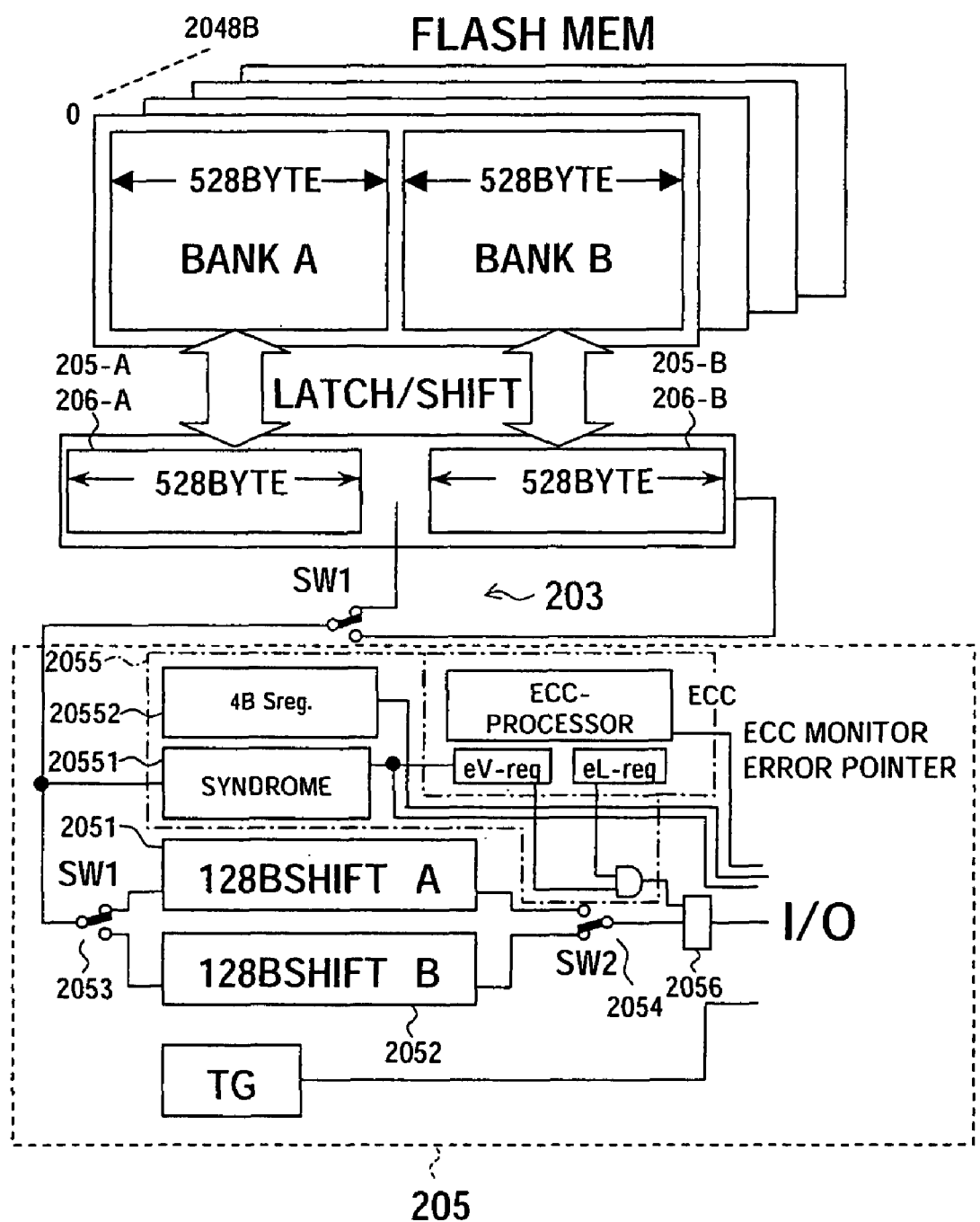
FIG. 10 is a circuit diagram showing a specific example of the configuration of a data output portion according to the present embodiment.

FIG. 10 is a circuit diagram showing a specific example of the configuration of the data output portion 205 according to the present embodiment.

The data output portion 205 of FIG. 10 has a plurality of (in the present embodiment, two, i.e., first and second) shift registers 2051 and 2052 for successively shifting the code words CW except the 4 bytes of the parity data included in the read page data transferred from the data latch circuit 225 through the multiplexer/demultiplexer 203 and able to hold the same, a first switch circuit (SW1) 2053 receiving the read page data including a plurality of (in the present embodiment, four) code words CW and alternately inputting the successive code words to the different first shift register 2051 and the second shift register 2052 under the control of the control circuit 207, a second switch circuit 2054 for selectively outputting the code word data to which all of the code words CW are shifted in between the first and second shift registers 2051 and 2052 under the control of the control circuit 207, an error correction circuit 2055 for correcting the error data when there is within a predetermined number of error data in the main code words corresponding to the code words selected so as to be output now by the second switch circuit 2054, and an additional circuit 2056 for adding (combining) the error information by the error correction circuit 2055 with respect to the code words CW of 128 bytes selectively output by the second switch circuit 2054, adding the error information by the error correction circuit 2055 with respect to the code words selectively output by the second switch circuit as 132 bytes of the main code words MCW, and transferring the same to the external CPU 3 via the I/O buffer 206.

The error correction circuit 2055 has a syndrome generation circuit 20551, a 4-byte syndrome register (4BSreg) 20552, an ECC processor 20553, an error vector register (eV-reg) 20554, an error location register (eL-reg) 20555, and a 2-input AND gate 20556.

In the error correction circuit 2055 having such a configuration, the syndrome generation circuit 20551 computes the syndrome on an H matrix. Then, from the error vector and the error location obtained by the error correction processing, at the timing of the shift out of the data of the first shift register 2051 or the second shift register 2052 selectively output by the second switch circuit 2054, it is output to the additional circuit 2056 for adding the error vector to the error data.

The data output portion 205 outputs the previously generated syndrome together with the data to the external CPU 3 through the I/O buffer 206. Further, the information indicating the state of the error correction is output as the error correction pointer. This information includes the following content. This is information indicating the states of a case where there is no error, N and the error location in a case where N bytes are corrected and a case where the correction was not possible.

The I/O buffer 206 includes a high speed interface (I/F) corresponding to the CPU 3 side, that is, the host (bridge) side, and has connected to it a plurality of data input/output pins PD206 for input/output of data with the bridge circuit 4, an input pin PCA206 for input of the command/address, and an input/output pin PL206 for input/output of the control signal.

The command/address and the control signal are transferred between the CPU 3 and the control circuit 207 through the I/O buffer 206.

The control circuit 207 receives as input commands such as a read command RD and a write command WR input through the I/O buffer 206 and the address to be read or written, controls the banks 201 and 202, the multiplexer/demultiplexer 203, a data input portion 204, the data output portion 205 and a booster circuit 208, and supplies the address to the address register 209.

The control circuit 207 receives as input a control system signal, such as a chip enable signal /CE, a read enable signal /RD, or a write enable signal /WE through the I/O buffer 206 and controls the read and write operations of the page data of the banks 201 and 202. Further, the control circuit 207 performs the control of the data input/output of the data input portion 204 or the data output portion 205 in accordance with the control system signal and the commands. Particularly, it controls the switching of the switch circuits and, in parallel to this, controls the column selector 226 through the column decoder 227 to control the input/output of the data of the data latch circuit 225. Further, it controls the switching of the multiplexer/demultiplexer 203. Namely, the control circuit 207 performs the processing for decoding the control signal and command to enable the entire flash memory 2, etc., judges to which of the bank (A) 201 or the bank (B) 202 the access (read or write) instructed by the command is made to, and performs the predetermined access control. Further, the control circuit 207 specifically instructs the voltage to be boosted up to the booster circuit 208 so as to obtain a voltage in accordance with the command, since the voltages to be supplied to the drive line at the time of the read and write operations are different as mentioned above.

The control circuit 207 has an address translation table for performing interleave control/command control/address designation (bank/block/page), outputting the control signal, command, and address to the banks 201 and 202, controlling the data input/output, and performing the address translation processing (mapping for translating the logical address designated by the host to the physical address on the flash memory, the logical/physical address translation processing).

The booster circuit 208 boosts up the voltage to generate the power supply voltage VCC in response to a read or other command in accordance with the instruction of the control circuit 207 and supplies the same to the row decoder 222 or the word line decoder 224 of the bank 201 or 202. For example, at the time of a read operation, as previously mentioned, a voltage of 4.5V is necessary, so the voltage is boosted up from 3.3V to 4.5V. Further, at the time of a write operation, as previously mentioned, 20V and the intermediate voltage 10V are necessary, so the voltage is boosted up to 20V and 10V.

Here, an explanation will be given of the write and read operation sequences of the flash memory 2 according to the present embodiment with reference to the drawings. FIGS. 11A to 11I are timing charts for explaining the write operation sequence of the flash memory 2 according to the present embodiment. FIGS. 12A to 12I are timing charts for explaining the read operation sequence of the flash memory 2 according to the present embodiment.

First, an explanation will be given of the write operation sequence of the flash memory 2 with reference to FIGS. 11A to 11I.

<Data Write Operation>

As shown in FIG. 11A, one page's worth of successive write data able to be divided to four code words transferred from the CPU 3 is input through the I/O buffer 206 to the data input portion 204. Under the control of the control circuit 207, the first switch circuit 2043 is switched to the input side of the first shift register 2041. As shown in FIGS. 11A and 11B, the input data is input to the first shift register (128B Shift A) 2041 and the syndrome generation circuit 20451. As shown in FIGS. 11B to 11E, when the first shift register 2041 to which 128 bytes of the data were input as the code words becomes full with the data of 128 bytes, the four variables as the result of the matrix processing using the input signal generated at the syndrome generation circuit 20451 and the coefficient are sent to the G matrix processing circuit 20452. The syndrome generation circuit 20451 is reset in parallel to this. Next, under the control of the control circuit 207, the first switch circuit 2043 is switched to the input side of the second shift register (128B Shift B) 2042, and the next 128 bytes of data are input to the second shift register 2042 and the syndrome generation circuit 20451 by switching. Until this second shift register 2042 becomes full with 128 bytes of the data, 4 bytes of the parity on the first shift register 2041 side are calculated. Then, 128 bytes of data of the first shift register 2042 are output from the second switch circuit 2044, 4 bytes of the parity data PD are added (combined) with this 128 bytes of data (one code word CW) at the additional circuit 2046, and thus one main code word MCW is completed. Then, the main code word MCW of 132 bytes is formed and transferred to the bank (A) 201 or bank (B) 202 through the multiplexer/demultiplexer 203. The same operation is carried out at the point of time when the second shift register 2042 becomes full with the data of 128 bytes. At the point of time when four main code words are successively transferred by repeating this four times, the data latch circuit 225 of the bank (A) 201 or bank (B) 202 becomes full with the data of 512 bytes+16 bytes. At this time, under the control of the control circuit 207, the multiplexer/demultiplexer 203 is switched so as to be able to transfer the data to the data latch circuit 225 of the bank (B) 202 or bank (A) 201.

Note that, although not mentioned in the present embodiment, this one page data enters the write-verify operation. After confirming that the write data was correctly written, the write operation is terminated. However, when the error of the code words is within the error correction capability at this point of time, even when the write operation is weak and the complete data is not written due to a defect in the circuit etc., it can be restored at the time of the read operation, so the verify operation can be terminated. By repeating the above operations, the data and the parity data can be written into a plurality of banks at a high speed.

Next, an explanation will be given of the read operation sequence of the flash memory 2 with reference to FIG. 10 and FIGS. 12A to 12I.

<Data Read Operation>

The page data of 512 bytes+16 bytes including the four main code words MCW of 132 bytes read from the cell array 221 of the bank (A) 201 or the bank (B) 202 and added with the parity data is latched by the data latch circuit 225. Thereafter, as shown in FIGS. 12A to 12G, under the control of the control circuit 207, for example, one main code word MCW among the latch data of the data latch circuit 225 is transferred through the multiplexer/demultiplexer 203 to the data output portion 205. The data output portion 205 shifts in the data to the first shift register 2051 via, for example, the first switch circuit 2053 and in parallel to this inputs the data to the syndrome generation circuit 20551 of the error correction circuit 2055. Then, at the point of time when the data is shifted into the first shift register 2051 to which one main code word is transferred, the syndrome finishes being generated by the syndrome generation circuit 20551 and is stored in the syndrome register (4Bsreg) 20552. In the data output portion 205, further, the next main code word MCW is transferred. At this time, under the control of the control circuit 207, the first switch circuit 2053 is switched to the input side of the second shift register 2052, and the transferred next main code word MCW is shifted into the second shift register 2052. At this time, the syndrome generation circuit 20551 and the syndrome register 20552 are cleared and the generation of the syndrome of the new code word is started. In this way, by ending the error correction of the previous code word by the completion of the transfer of the next code word, it is possible to continue this correction processing without any effect upon the read speed. This processing is executed for the four main code words included in one page. Then, as shown in FIGS. 11A to 11I, based on the error vector and the error location obtained by the error correction processing, the error vector is added to the intended error data at the time when this read out data is shifted out so as to thereby complete the error correction processing.

If the error correction cannot be performed, for example, when there are more errors than the correctable number determined by, for example, the minimum distance, the previously generated syndrome is output together with the data to the outside. Further, the information indicating the state of the error correction is output as the error correction pointer.

<Other Data Read Mode>

An explanation will be given of the other read mode. This mode performs the error correction processing and judges whether the repetition of the write-verify operation is to be continued or stopped. Without regard to the reason, even when the error remains, if the error is within the correction range, the judgment is made to stop this operation. For example, when it is possible to restore the error by a single correction by assuming that the correction capability enables double correction, the verify operation is suspended. In this case, it is possible to correct the error even when there is an increase of one error until the data is read thereafter. In other words, it is judged by ECC how many errors remain by the verify operation. If this method is not employed, a data comparator for storing the correct data to be verified in a register and judging if all of the read data is the same as in the registers or, if it is different, by how many bytes it is different becomes necessary.

As explained above, according to the present embodiment, provision is made of a data input portion 204 for dividing one page's worth (512 bytes' worth) of the data transferred from the CPU 3 through the I/O buffer 206 into four code words CW, generating and adding 4 bytes of parity data for each code word (128 bytes), successively forming four main code words MCW each including 132 bytes, and transferring the same through the multiplexer/demultiplexer 203 to the bank (A) 201 or the bank (B) 202 under the control of the control circuit 207 and a data output portion 205 for receiving one page's worth (512 bytes+16 bytes) data including four main code words MCW transferred from the data latch circuit 225 through the multiplexer/demultiplexer 203, correcting the error data when there is within a predetermined number of error data for each main code word (132 bytes), adding the error information for each read code word CW except the parity data PD, and transferring the result via the I/O buffer 206 to the external CPU 3 under the control of the control circuit 207, so that the following effects may be obtained.

Namely, by configuring the data forming one page by a plurality of code words, the correction capability can be strengthened. Further, by configuring the data by a plurality of code words, it becomes able to use the remaining data even when there is a code word which becomes unable to be corrected. Further, by using the Reed Solomon Code, the correction capability becomes stronger in comparison with the ECC of a general nonvolatile semiconductor memory device. Further, it is possible to output information expressing the state of correction and the syndrome data to the outside at the time of a read operation, to extend the error correction to multi-dimensional error correction on the outside, and further to strengthen the error correction capability. Further, by providing a plurality of shift registers, etc., it is possible to continuously perform the error correction and check without the influence of the time taken for them exerted upon the time of the input/output of the data and to speed up the read and write operations. Further, by strengthening the error correction, it is possible to decrease the number of times of write-verify operations in comparison with the past and to reduce the time taken for a write operation. Further, by strengthening the error correction, it is possible to make the redundant memory unnecessary or smaller or to make the work of replacement unnecessary or smaller. Due to this, it is possible to reduce the size of the memory per se, decrease the number of processes, and possible to reduce the costs. Further, by providing a plurality of banks, it becomes possible to read data at a high speed by making the read random access time appear to be nonexistent.

Further, the flash memory 2 has the error detection/correction processing circuit, and therefore it becomes able to reduce the processing on the host side by the error detection/correction processing of the read data from the flash memory.

Note that, in the present embodiment, an explanation was given of the case of two banks as an example, but needless to say the present invention may be applied to a semiconductor memory device provided with a larger number of banks, for example, four or eight banks.

It should be understood by those skilled in the art that various modifications, combinations, sub-combinations and alterations may occur depending on design requirements and other factors insofar as they are within the scope of the appended claims or the equivalents thereof.

What we claim is:

1. A semiconductor memory device comprising:
a cell array formed by a plurality of memory cells storing page data therein arranged in a matrix,
wherein the page data is stored in the cell array in units of pages the page data is divided into a plurality of sectors,
the plurality of sectors are divided into a plurality of code words and a plurality of check codes corresponding to the plurality of code words, and
the plurality of sectors are successively transferred to a latch circuit;
a plurality of shift registers able to successively shift and hold the plurality of code words included in the page data to be written;
a first switch circuit for receiving the page data to be written including the plurality code words and inputting at least a successive code word of the plurality of code words to the plurality of shift registers;
a second switch circuit for selectively outputting the successive code word data of each shift register in which the successive code words are all shifted;
a check code generation circuit for checking the successive code words selected so as to be output by the second switch circuit and generating the check codes; and
an additional circuit for adding the check codes to the successive code words selectively output by the second switch circuit and outputting the same as the main code words to the latch circuit.

2. A semiconductor memory device as set forth in claim 1, wherein the page data including the plurality of sectors composed of the plurality of code words and check codes are stored in the cell array in units of pages all together.

3. A semiconductor memory device as set forth in claim 2, wherein the units of pages are units of word lines.

4. A semiconductor memory device as set forth in claim 1, wherein said cell array includes NAND memory strings formed by a plurality of memory cells connected in series.

5. A semiconductor memory device as set forth in claim 1, wherein the unit of pages are units of word lines.

6. A semiconductor memory device as set forth in claim 1, wherein the latch circuit is configured for latching the page data to be written that includes at least the plurality of sectors.

7. A semiconductor memory device as set forth in claim 1, further comprising:
a correction circuit, positioned in parallel with the plurality of shift registers, that corrects errors in the page data when a number of errors in a given main code word is within a predetermined number of errors, adding corresponding error correction information to the given main code word, except the check code, and outputting the result; and
an additional circuit that adds the error correction information from the correction circuit to the successive code words output by the second switch circuit and outputs corrected code words.

8. A semiconductor memory device as set forth in claim 7, wherein said data output portion further comprises a syndrome data generator, and syndrome data output, and wherein while performing error correction, the error correction circuit outputs the syndrome data when it is unable to correct an error.

9. A semiconductor memory device as set forth in claim 7, wherein the error correction circuit of said data output portion further comprises an output for indicating the state of the error correction.

* * * * *